Jan. 14, 1947.   H. W. POLLACK   2,414,241
ARTICLE OF FURNITURE
Filed Feb. 12, 1945

INVENTOR.
Hans W. Pollack
BY
Armand E. Meston
Attorney.

Patented Jan. 14, 1947

2,414,241

UNITED STATES PATENT OFFICE 2,414,241

ARTICLE OF FURNITURE

Hans W. Pollack, Jackson Heights, N. Y.

Application February 12, 1945, Serial No. 577,405

4 Claims. (Cl. 211—148)

This invention relates to an article of furniture, such as a table, a shelf or the like, provided with a detachable and decomposable leg, said leg being composed of at least two sections.

The construction of the type referred to presents the inconvenience that the sections of the leg do not fit exactly together and to the adjacent elements of the furniture, such inconvenience being especially due to the unequal shrinkage of the wood, whereby the separation of the leg into its component parts and the readjustment of the said leg becomes rather difficult. This is especially true with legs having a rectangular or polygonal or curved (other than circular) cross section.

It is an object of the invention to avoid these inconveniences and to provide an easy detachment, separation and readjustment of such a leg.

It is a further object of the invention to simplify the construction of a leg of the type referred to.

Figure 1:
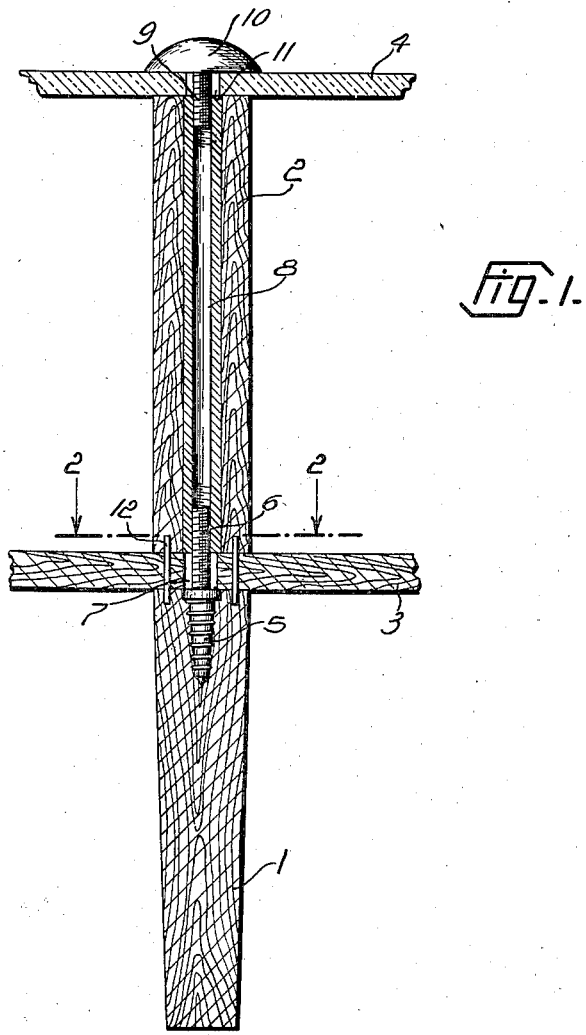
Figure 2:
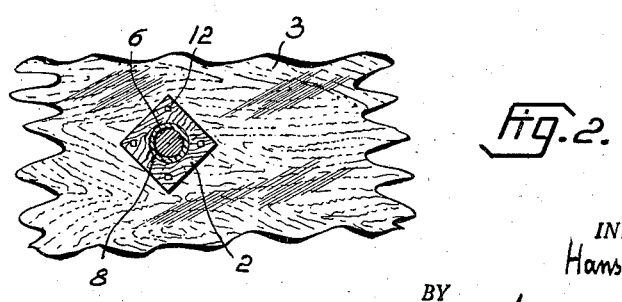

Other objects of the invention will become apparent from the following description and the annexed drawing wherein Fig. 1 is a longitudinal section through an embodiment of the invention and Fig. 2 is a section taken on line 2—2 of Fig. 1.

The embodiment of the invention illustrated in the drawing shows a wooden leg consisting of two sections, 1, 2, abutting against opposite sides of a plate 3 which is parallel to the top plate 4 of a table or shelf.

A screw 5, 6 passing freely through a hole 7 in the plate 3 is threaded in the lower leg section 1. The lower portion 5 of this screw is provided with threads adapted particularly for wood, whereas the upper portion 6 of said screw is provided with threads adapted for a metal nut. The nut is represented by a tube 8 forming the core of the leg section 2, and having screw threads at the inside. The tube 8 passes freely through a central bore in the upper leg section 2 and abuts with its ends against the plates 3 and 4. In order to hold the plate 4 firmly in the position shown a screw 9 is threaded in the upper end of said tube, said screw passing freely through a hole 11 in the load carrying top plate 4 and bearing with screw head 10 against the upper plane of plate 4.

In order to prevent the leg sections from changing their relative positions in circumferential direction, one or a plurality of dowel pins 12 are provided, which are parallel to the axis of the leg and are inserted in holes in the leg sections 1, 2 and in the plate 3. These dowel pins 12 are preferably arranged symmetrically to the leg axis and surround the tube 8.

In building up the structure which I have described above, the screw 5, 6 is threaded with its lower part 5 in a central bore provided in the lower leg section 1. The dowel pins 12 are inserted in the holes of the leg section 1 and the plate 3 put on the top of said leg section in such a position that the dowel pins enter in the corresponding holes of plate 3, and the screw 5, 6 passes through the central hole 7 in said plate 3. Thereupon the tube 8 is screwed on the upper portion 6 of the screw 5, 6, thereby pressing on plate 3 and fixing the same in its position. Now the leg section 2 and the top plate 4 are slipped over said tube 8. The leg section 2 is rotated on the tube 8 to such a position that the upper part of the dowel pins 12 may enter the corresponding holes in the lower part of the upper leg section 2. Finally the screw 9 is threaded in the upper part of tube 8, pressing the ends of tube 8 against the plates 3 and 4 and completing the connection of the leg sections and load carrying plates 3, 4.

It is obvious that this construction makes possible the easy assembly of tables, bookcases, etc., not only comprising two series of shelves but also a plurality of shelves. Furthermore, it permits easy detachment of the legs and separation into the component parts thereof. Moreover the construction assures an accurate alignment of the planes forming the surfaces of the leg sections, which is especially important for legs having a rectangular, polygonal, oval or other irregular cross section.

Although only a preferred embodiment of this invention has been shown and described herein, it will be apparent that numerous variations and changes may be made therein without departing from the spirit of this invention. For example, the core 8 may consist of a solid rod with hollow ends, said ends being threaded on the inside, or the core may be provided with screw threads on the outside and the screws 5, 6, 9 could be replaced by suitable nuts without departing from the essential features of the invention. The foregoing description and drawing are deemed to be illustrative only and the invention is to be limited only by the appended claims.

I claim:

1. In an article of furniture a detachable composite leg, comprising at least two leg sections, a cylindrical core in at least one of the sections, said core having screw threads on both of its ends, adapted to be engaged by screws provided in said leg sections, and at least one dowel pin arranged beside at least one end of said core and penetrating in the leg sections coupled together by the screw connections.

2. In a detachable composite leg as defined by claim 1, the cylindrical core consisting of a tube provided with screw threads.

3. In an article of furniture having spaced parallel plates and a detachable leg as defined by claim 1, the ends of the core abutting against said parallel plates of the furniture, the dowel pins extending through said plates.

4. In an article of furniture having a pair of parallel spaced plates and a detachable composite leg, comprising a plurality of leg sections, a tube forming the core of one of the sections, said tube resting with its ends on parallel plates of the furniture, screw threads in said tube, a screw fastened to the other section of the leg engaging the screw threads at one end of the tube and passing through an opening in one of said plates, a screw passing through the other plate and engaging the screw threads at the other end of the tube, a plurality of dowel pins surrounding one of the screws and inserted in holes in the ends of the leg sections and in the plate between said leg sections.

HANS W. POLLACK.